(12) United States Patent
Jarvinen

(10) Patent No.: US 7,592,783 B1
(45) Date of Patent: Sep. 22, 2009

(54) P-STATIC ENERGY SOURCE FOR AN AIRCRAFT

(76) Inventor: Philip Onni Jarvinen, 15 Fairway Dr., Amherst, NH (US) 03031

(*) Notice: Subject to any disclaimer, the term of this patent is extended or adjusted under 35 U.S.C. 154(b) by 57 days.

(21) Appl. No.: 11/998,883

(22) Filed: Dec. 3, 2007

(51) Int. Cl.
*H02N 1/00* (2006.01)
(52) U.S. Cl. .................. 322/2 A; 290/1 A; 290/1 R; 361/117
(58) Field of Classification Search ........... 322/2 A; 290/1 A, 1 R; 361/117
See application file for complete search history.

(56) References Cited

U.S. PATENT DOCUMENTS

| | | | |
|---|---|---|---|
| 2,466,024 A | 4/1949 | Hall | |
| 2,466,311 A | 4/1949 | Hall | |
| 4,796,153 A | 1/1989 | Amason et al. | |
| 6,175,163 B1 * | 1/2001 | Rinaldi et al. | 290/6 |
| 7,514,804 B2 * | 4/2009 | Wang | 290/1 R |

OTHER PUBLICATIONS

"MEMS Microphone-Amp Chip Breaks Acoustics Ground" http://electronicdesign.com/Articles/ArticleID/5149/5149.html.

"Mouser Electronics May-Jul. 2007 Catalog 630" p. 630—Murata High Voltage Ceramic Chip Capacitors Section : 1812 Case Size, Item 8: Murata Part No. GR443DR73D472KW01L p. 631—Murata High Voltage Ceramic Chip Capacitors Section : 2220 Case Size, Item 1: Murata Part No. GRM55DR73A104KW01.
PICO Catalog 2008, p. 113 Section : Series PD Single—100 Watts—Input 200—380 VDC Item 1: Pico Part No. PD3.3S.

* cited by examiner

*Primary Examiner*—Nicholas Ponomarenko
*Assistant Examiner*—Iraj A Mohandesi (57) ABSTRACT

A means for harvesting local energy and using it to generate local electric power is disclosed which uses as its energy source P-Static charge generated on the external surfaces of aircraft flying through the earths atmosphere or generated on the external surfaces of electrically ungrounded objects immersed in the wind and subjected to the impact of charge generating ingredients contained in the atmosphere or wind. The P-Static charge is collected and stored in a high voltage rechargeable capacitor storage unit at several thousand volts with energy removed from the storage unit as needed and converted to low voltage DC or AC power which, in turn, is used to power local, low power consumption electronic chips and devices. Data measured by the chips or devices is relayed wirelessly back to a receiver located within the aircraft or object with the wireless transmitter also powered by the P-Static Electrical Power System.

20 Claims, 5 Drawing Sheets

Figure 1

Figure 2 capacitors in parallel $$C = C_1 + C_2$$

P-STATIC ENERGY SOURCE FOR AN AIRCRAFT

COPYRIGHT NOTICE

A portion of the disclosure of this patent document contains material that is subject to copyright protection. The copyright owner has no objection to facsimile reproduction of the patent document or the patent disclosure, as it appears in the Patent and Trademark Office patent file or records, but otherwise reserves all copyright rights whatsoever.

FIELD OF THE INVENTION

The invention relates to the field of energy harvesting. In particular, it relates to the harvesting of P-Static electrical charge generated on external surfaces of an aircraft flying through the earths atmosphere or on the external surfaces of any electrically ungrounded object subjected to the wind and the use of the P-Static charge, harvested and conditioned locally, to power local low power consumption, low operating voltage electronic chips and devices and, in addition, to power a wireless transmitter that relays locally measured information and/or data back to a central receiver for use or recording.

BACKGROUND OF INVENTION

It is well known that an aircraft will build up a significant static charge on its external surfaces while flying due to impact of the aircraft with rain, snow, sleet, dust, ash or fog resulting in triboelectric charging due to particle impact, this being the major contributor to aircraft charging in general. This type of charging has been labeled P-Static charging by those working in the field of aviation and is a distinct and different process of electrical charging phenomena than, for example, the process of generating static charge by the rubbing of two materials against each other such as a glass rod against wool or fur. To a lesser degree, static charge may also be acquired on an aircraft due to its movement through the earth's electrical and magnetic fields, when in the vicinity of electrical storms or by that generated by the aircraft's propulsion system either jet engine or propeller type. For purposes of this application, the invention is for the local harvesting of P-Static charge, its conversion locally to useful low voltage electrical power, and the use of that electrical power by locally collocated electronic devices and a wireless transmitter. The other types of aircraft static charge mentioned above will also be captured by the invention if they are found to be locally available too.

It has been noted by others that a large aircraft such as a Boeing 707 aircraft will charge in-flight to a level of several hundred thousands volts or higher if the aircraft does not have means to discharge the static electrical charge that is building up and accumulating on the aircraft. If the aircraft can not rid itself of static charge, the voltage potential will build up from low to higher and higher levels and a point will be reached where corona discharge occurs directly from the aircraft or its appendages and the resulting electrical energy that is radiated from these high voltage discharges will interfere with aircraft communication and navigation systems. Since 1949 and even earlier, apparatus has been developed which is attached to the aircraft and prevents serious corona discharge from occurring. One example of such a discharger is that described in U.S. Pat. Nos. 2,466,024 and 2,466,311 by W. C. Hall which discharges the static charge to the surrounding atmosphere. These early efforts focused on methods to discharge the unwanted and bothersome static charge at low enough voltage potentials that interference due to corona discharge is reduced or nearly eliminated. The inventions of W. C. Hall utilized a discharger employing either fibrous surfaces of non-conducting wicks moistened with a liquid of suitable electrical conductivity or fiber wicks made semi-conducting by incorporation therein of finely dispensed conducting materials or by impregnating them or coating them with microscopic metal particles. Such wicks were mounted on the aircraft, trailing in a downstream direction, at its wing tips and trailing edges as well as on the horizontal stabilizer and vertical tail. Improvements in existing discharger designs and the development of new designs for static charge dischargers which diminish corona discharge effects have continued to this day with over fifty related patents being granted since 1949.

As a result of recent developments in technology, electronic devices capable of performing certain tasks have been reduced substantially in physical size and power usage. For example, electronic units that previously weighed several kilograms, took up several cubic meters of space, and used amperes of electrical power to perform a given task are now replaced by electronic chips or micro-electro-mechanical (MEMS) devices weighing mere grams with their volumes measured in cubic millimeters and power in milliamperes. These reductions in weight, size and electrical power requirements now allow the realization of innovations not previously believed possible.

As an example of an invention made possible through utilization of the new technology, the present inventor filed a Utility patent application Ser. No. 11/804,701 for an ice detection system in which the ice sensor is collocated with all supporting electronics and data processor in a small, thin, pliable patch mounted to the exterior surface of an aircraft. The patch does not increase the aircrafts drag significantly or interfere with the flowfield about it since the miniature size of all components selected for use in the subject ice detection system allows such a patch to have a vertical height measured in millimeters. A major element used in that invention is an impedance measurement chip, No. 5933 by Analog Devices Inc, which measures 6.2 mm in width, 7.8 mm in depth and 2.0 mm in height and which draws only 10 milliamperes or 25 milliamperes depending on whether it is operating in the Standby Mode or Operational Mode; size and power levels unbelievable just a few years ago. By being able to collocate all components of the ice detection system together, wire and coaxial cable lengths between components are much reduced with significant savings in weight and cost as well as diminished detrimental cable effects in the measured data.

Another example of a device that is available for use as an externally mounted, low power consumption sensor on an aircraft is the Akustica AKU2000 MEMS microphone on a chip whose frequency range is 100 Hz to 10,000 kHz and which is fabricated on a 3.0 mm wide by 3.65 mm deep by 0.5 mm high chip which operates from a 3 volt supply (5 volt maximum) and consumes less than 130 microamperes. Such a device could be used to monitor sound levels radiated by an aircraft during takeoff, flight and landing and used to determine the physical locations on the aircraft of major noise sources. Based on this example, along with the previous one and others not discussed, DC electrical power requirements for realistic advanced miniature electronic devices for use on aircraft fall in the range from approximately 0.1 milliamperes to 25 milliamperes at voltages in the range from 3 volts to 5 volts with an additional 10 milliamperes needed to power the wireless transmitter again at an operating voltage in the range from 3 volts to 5 volts.

Though the electrical power requirements are small for the two examples considered above, they presently require that electrical power be provided to them through wire runs connected internally from the aircraft power system to them; these wire runs having lengths from a few meters to over thirty meters in length depending on the size of the aircraft being instrumented and the placement location chosen for the devices on the aircraft. They also require that the aircraft be wired internally with wiring that carries back information and/or measured data to the interior of the aircraft for use or recording. A significant improvement in the acceptance and use of such miniature measurement devices would result if the wires needed to supply electrical power to the devices (and wires for return of data) could be eliminated and needed electrical power provided by local means. If local power generation were possible, it would allow such devices to be located anywhere on the aircraft without consideration of how wires would be guided to them through the interior of the aircraft; resulting in a significant savings in time, materials and installation costs in preparing for their usage. It is well known that any internal modifications to an aircraft such as new wire runs are time consuming to install and excessively expensive to incorporate. What is needed and what would be a significant improvement over what can be achieved today is a way to produce and store electrical energy locally for use by these miniature, low power electronic devices.

Such an improvement is now offered by the present invention which collects P-Static charge locally along with other static charge if also available locally, stores it locally in a rechargeable capacitor (or rechargeable battery) storage unit and provides electricity, after local power conditioning, directly to nearby devices as needed. For power requirements of the device that are low in comparison to the P-Static Electrical Power Systems capability, the power is provided continuously. If the power requirements of the device are large with respect to the local P-Static Electrical Power Systems capability, the device is provided power on an intermittent basis. Use of a P-Static Electrical Power System on an aircraft or on an electrically ungrounded object subjected to the wind and charged P-Statically will now be considered in more detail.

The invention consists of the following parts from input to output: a dielectric charge generator, an upstream overvoltage protection circuit, a relay/solid state switching circuit connected downstream to an excess charge discharger or to a rechargeable capacitor and/or battery storage unit, a DC-DC and/or DC-AC down converter, a downstream overvoltage protection circuit, a device or devices to be powered, a wireless transmitter and a lightning protection unit.

The P-Static invention discussed herein initially stores the electric charge at high voltage in a rechargeable capacitor (or rechargeable battery) storage unit. It then converts the energy to usable voltage and power through a DC-to-DC and/or DC-to-AC step down converter. The maximum amount of energy stored in the P-Static power system depends on the maximum voltage capability selected for the rechargeable capacitor (or rechargeable battery) storage unit as well as the total capacitance of the assembled capacitors or the number of rechargeable batteries used and whether the rechargeable capacitor (or rechargeable battery) is recharged while in use. Implicit in the present invention is the fact that information or data measured and/or processed by the local low power consumption sensor or electrical device is transmitted wirelessly from the sensor or device back to the interior of the air vehicle or to the interior of the ungrounded object for use or recording; thus eliminating the need for wires in the return direction.

The invention provides a major improvement in the design of an experiment or an application on an aircraft in that it eliminates the requirement that electrical wiring be installed internally in the aircraft to provide electrical power to each and every device as well as eliminating the wiring necessary to carry signals back from the devices. Thus installation of devices is simplified; devices may be mounted anywhere on the air vehicle or ungrounded object and installation costs are substantially reduced. The electrical charge that is harvested is called P-Static charge and is normally considered undesirable and unwanted. If P-Static charge is allowed to build with time and not dumped from the aircraft or diminished in some way, it causes electrical discharges to occur on the aircraft and the electrical noise resulting from those discharges interferes with communication and navigation equipment as well as other aircraft electronic equipment. Because P-Static charge causes such problems, much effort is normally expended to discharge it from the aircraft to the surrounding atmosphere using static dischargers attached to the aircraft. The present invention, for the first time, utilizes aircraft generated P-Static charge in a useful manner as an energy source.

As to prior art, a thorough and extensive search of prior art on aircraft P-Static charging was conducted and no patent was found that used P-Static charge in any manner other than to get rid of it nor, in particular, in any useful manner as done in the present invention. All prior patents for aircraft P-Static charge treated it as something to eradicate rather than something that might be put to good use. Nowhere in the prior art was a suggestion found that aircraft P-Static charging could be used for any useful purpose such as energy harvesting as considered in the present invention.

SUMMARY OF THE INVENTION

The present invention utilizes P-Static charge, considered in all prior art as always unwanted, bothersome and something to be reduced or eradicated without question as quickly as possible from the aircraft, to locally generate the electrical power required by low power consuming, externally or internally mounted sensors or devices or other applications. There are a number of possible applications on an aircraft that might make use of such locally generated electrical power. These include the example ice detection system and the MEMS microphone device mentioned earlier. The MEMS microphone would find immediate application as a way to measure radiated aircraft noise during takeoff, cruise and landing. Since it could be mounted anywhere on the aircraft, it could be used to differentiate between radiated sound contributions from aircraft components: fuselage, wing, tail, engines and landing gear when deployed. Presently, individual sound contributions are not measured in-flight by devices on the aircraft itself. The present approach to sound measurement is to record the aircraft total sound signature using instruments mounted on the ground as the aircraft makes a pass flying overhead or measured from another aircraft flying near the first. For instance, being able to measure the magnitude of individual aircraft sound contributions in-flight would be of extreme help to the joint United States/Great Britain "Quiet Aircraft" venture now being studied collectively by Massachusetts Institute of Technology and Cambridge University as well as NASA.

Being able to position and locally power miniature electrical devices anywhere externally on the aircraft, would allow many parameters of interest to aircraft designers and users to be measured. These measurements are not made presently because of the complexity and cost of doing so. One can envision low power, miniature sensors which are used, for instance, to measure aircraft surface temperature distributions, or airflow directions, or vibration levels; all built from miniature, low power consumption components with measured results communicated wirelessly back to the aircraft interior for real time use or recording. Other applications that are envisioned include miniature boundary layer probes, skin friction probes, remote pitot static systems, miniature black and white camera installations, or LED lighting devices powered locally by the present invention.

The present invention includes the following features: a thin sheet of dielectric material which is bonded or glued to the aircraft or electrically ungrounded objects surface and upon which P-Static charge is generated, a series of high resistance electrodes in intimate electrical contact with the dielectric sheet that form a pattern that covers a small portion of the sheet and which collects the P-Static charge and carries it away to the rechargeable capacitors or rechargeable batteries for storage and/or power conditioning. A DC-to-DC step down converter is placed between the rechargeable capacitors (and/or rechargeable batteries) and the DC device to be powered. A relay/solid state switching circuit, provided between the dielectric sheet and the rechargeable capacitors (or rechargeable batteries), controls the charging of the rechargeable capacitors (or rechargeable batteries) so they do not exceed a given maximum storage voltage. A wireless transmitter, also powered by the P-Static Electrical Power System, relays information or data measured locally back to a receiver in the aircraft or ungrounded object. Lightning protection is provided by a collocated lightning protection unit of standard commercial design.

The switching circuit disconnects the rechargeable capacitors (or rechargeable batteries) from the dielectric sheet charge input when a preselected maximum design voltage is reached on the rechargeable capacitors (or rechargeable batteries). Such a condition may occur when the rechargeable capacitors (or rechargeable batteries) are fully charged and the device being powered is not consuming energy or not consuming enough energy to keep the dielectric sheet voltage and thus the rechargeable capacitor (or rechargeable battery) voltage from continuing to rise and exceeding the preselected maximum design voltage value. The maximum operating voltage for the dielectric sheet and rechargeable capacitors (or rechargeable batteries) is chosen to be of a magnitude such that the amount of corona discharge radiated energy from the dielectric sheet, if it should occur, is limited to a diminished level during power system operation so as not to interfere with aircraft communication or navigation systems. A maximum operating voltage in the range of a few thousand volts or less, from 1000 volts to 2000 volts, accomplishes this. The relay/solid state switching circuit continues to redirect the dielectric sheet output away from the rechargeable capacitors (or rechargeable batteries) until the rechargeable capacitor (or rechargeable battery) voltage decreases to a preselected minimum voltage level due to subsequent device energy consumption. When the minimum operating voltage level is reached, the relay/solid state switching circuit reconnects the dielectric sheet output to the rechargeable capacitor (or rechargeable battery) storage unit. A second approach is also possible. With energy consumption underway, the switching circuit intermittently connects and disconnects the dielectric sheet input to the rechargeable capacitors (or rechargeable batteries) to maintain the rechargeable capacitor (or rechargeable battery) voltage in its operating range while not letting the rechargeable capacitor (or rechargeable battery) voltage exceed its design value.

If the device to be powered consumes AC power rather than DC, the DC-to-DC step down converter downstream of the rechargeable capacitors (or rechargeable batteries) is replaced by a DC-to-AC converter and if multiple devices are to be powered, one with DC and another with AC, both a DC-to-DC step down converter and a DC-to-AC step down converter are provided. In the case of rechargeable battery storage, the addition of a DC-to-DC step down converter between the dielectric sheet and the battery storage unit is needed to match the operating voltage range of the batteries.

The device being powered by the charged capacitors remains connected to the rechargeable capacitors (or rechargeable batteries) if the power demand of the device is less than that which can be provided by the P-Static power system at the capacitors (or rechargeable batteries) minimum voltage level. If the power demand of the device being powered exceeds the output of the capacitor (or rechargeable battery) system, the device will draw the capacitor (or rechargeable battery) voltage down until the minimum design voltage is reached and then the device is disconnected from the power system until the capacitors (or rechargeable batteries) are recharged. A zener diode circuit with resistance (or an equivalent circuit) is placed between the dielectric sheet and the capacitors (or rechargeable batteries) to protect the capacitors (or rechargeable batteries) from an upstream over-voltage condition should the relay/solid state switching circuit fail to operate as designed. It also protects the capacitors (or rechargeable batteries) from a voltage spike entering from the dielectric sheet end. The maximum operating voltage of the zener diode is chosen slightly higher than the maximum operating voltage of the capacitors (or rechargeable batteries).

A zener diode with resistor (or an equivalent circuit) is also provided between the rechargeable capacitors (or rechargeable batteries) and device being powered to protect the DC-to-DC step down converter located downstream of the capacitors (or rechargeable batteries) and the capacitors (or rechargeable batteries) themselves from receiving a voltage spike entering from the device end. Again, the maximum operating voltage of the zener diode is chosen just slightly higher than the maximum operating voltage of the capacitors (or rechargeable batteries). In addition, lightning protection is provided for the P-Static power system by placing a lightning diverter strip adjacent to it. One example of such a diverter strip is that described in U.S. Pat. No. 4,796,153 by M. P. Amason et al. The lightning diverter strip of that patent is constructed from a series of closely spaced metallic pieces, typically circular discs spaced from each other by small gaps, which form an ionized zone above the diverter strip when lightning approaches them. The ionized zone then diverts the lightning strike to a metallic frame or metallic surface of the aircraft or electrically ungrounded object where the lightning diverter strip is electrically attached thus protecting the P-Static charge electrical power unit. Other lightning protection designs are available and could be substituted for the example mentioned here.

A separate electrical circuit is also provided from the switching circuit unit to a charge discharger unit mounted physically downstream of the device to be powered. When the rechargeable capacitor (or rechargeable battery) unit reaches its fully charge state that supplementary circuit is engaged and unwanted charge output from the dielectric sheet is dumped overboard thru a charge discharger unit into the passing atmosphere. The charge discharger unit may be of many forms: one example that works is a metal brush-like form from which a multitude of sharp, pointed, thin wire bristles extend into the airflow and through which charge is dumped overboard to the airstream. This separate supplementary electrical circuit is disconnected by the switching circuit unit when the capacitor (or rechargeable battery) unit again can receive charge directly from the dielectric charge source and it is no longer necessary to bypass power from the main circuit on its way to the device being powered.

It is therefore an objective of the present invention to generate electricity from the P-Static charge which forms on external surfaces of an aircraft flying through the earths atmosphere or from the static charge forming on external surfaces of electrically ungrounded objects either fixed in place or moving which are subjected to winds which impinge on them.

It is a further objective of the present invention to utilize P-Static charge induced on aircraft and ungrounded objects by the impingement of charge inducing ingredients contained in the airstream or wind including but not limited to rain, sleet, snow, dust, ash and fog as well as static charge generated on them by interactions with the earths electric and magnetic fields, nearby electrical storm effects and vehicle propulsion systems.

It is a further objective of the present invention to use P-Static charging as an independent means to generate local electrical power.

It is a further objective of the present invention to generate electricity by using P-Static charge effects to produce both local DC and AC electrical power.

It is a further objective of the present invention to provide a non-conducting, dielectric surface of sufficient area to locally generate the needed electrical charge if the aircraft or ungrounded objects external surface will not naturally generate static charge or enhanced static charge production is desired.

It is a further objective of the present invention that it consist of the following elements listed in order of their location in the system: an upstream dielectric charge generator, an upstream overvoltage protection circuit, a relay/solid state switching circuit, an excess charge discharger, a rechargeable capacitor and/or battery energy storage unit, a DC-to-DC and/or DC-to-AC power conditioning step down converter units, a downstream overvoltage protection circuit, a downstream powered device or devices, a downstream wireless transmitter and a lightning protection unit.

It is a further objective of the present invention to use P-Static charge effects as an independent means for generating and supplying electrical power for low power consumption electronic chips and devices mounted on the external surface or in the internal volume of the aircraft or ungrounded object and for the transmittal of information and data from the chips and devices via wireless means to distant receivers for use or recording.

It is a further objective of the present invention to generate electricity by storing static charge at high voltages, in the range of a few thousand volts, in a high voltage rechargeable capacitor (or rechargeable battery) storage unit and then to convert the stored high voltage charge to low voltage electricity, in the range of a few volts, used by the miniature and micro-size electronic chips and devices by passing the electricity through local power conditioning units.

It is a further objective of the present invention that the storage of static charge be accomplished at a limit of a few thousand volts or less to minimize any possible electrical noise generated from corona discharge, should corona discharge occur.

It is a further objective of the present invention that a switching circuit be provided between the upstream static charge generating surface and the charge storage unit. The switching circuit operates to limit the maximum voltage seen by the energy storage unit by dumping excess charge overboard via the charge discharger unit. It also operates simultaneously to control the input voltage to the energy storage unit.

It is a further objective of the present invention that the means to dump excess electric charge overboard into the passing airflow be local and be automatic so as to prevent voltage build-up which would exceed the voltage capabilities of the capacitor (or battery) storage unit and power conditioning elements. For example, dumping of excess charge to be accomplished through a metallic charge discharge unit consisting of a pad covered with a multitude of slender, conducting, sharp metallic bristles which extend out into the airflow.

It is a further objective of the present invention that overvoltage protection circuits be included to protect the P-Static Electrical Power System from any unwanted high voltage spike that might try to enter from the upstream circuit direction or from the downstream end. The overvoltage protection circuits consisting of a zener diode and resistor (or equivalent circuit) located just upstream of the relay/solid state switching circuit and just upstream of the devices and transmitter to be powered.

It is a further objective of the present invention that all units comprising the overall P-Static Electrical Power System including the rechargeable capacitor (or rechargeable battery) storage unit be constructed from components whose vertical heights are limited to a few millimeters to prevent them from interfering with the airflow around the vehicle or effecting its drag significantly. The capacitor energy storage unit may be constructed from single or multi-layer configurations.

It is a further objective of the present invention that the P-Static Electrical Power System be protected from the effects of lightning strikes by locating a lightning protection unit adjacent to it. An example of a possible lightning protection unit is that contained in U.S. Pat. No. 4,796,153 by M. P. Amason et al. entitled "Lightning Diversion Strips For Aircraft". There are many other possible configurations that have been patented for lightning protection that might be used rather than the specific lightning diversion strip mentioned above.

It is a further objective of the present invention that the external surface located P-Static Electrical Power System be used to implement self-powered, remotely located devices anywhere on the external surfaces or internal volumes of aircraft or ungrounded objects being statically charged by the impact of the airstream or wind containing charging ingredients.

It is a further objective of the P-Static electrical power system that it also power a wireless transmitter used to relay information and data back from remotely located devices to the interior of the carrying aircraft or ungrounded object or other remote receiver at distances typically in the range from 30 meters to 1 meter or less between the P-Static Electrical Power System and the interior of the aircraft or ungrounded object.

The features and advantages described herein are not all inclusive and, in particular, many additional features and advantages will be apparent to one of ordinary skill in the art in view of the drawings, specifications, and claims. Moreover, it should be noted that the language used in the specifications has been principally selected for readability and instructional purposes, and not to limit the scope of the inventive subject matter.

DETAILED DESCRIPTION

Figure 1:
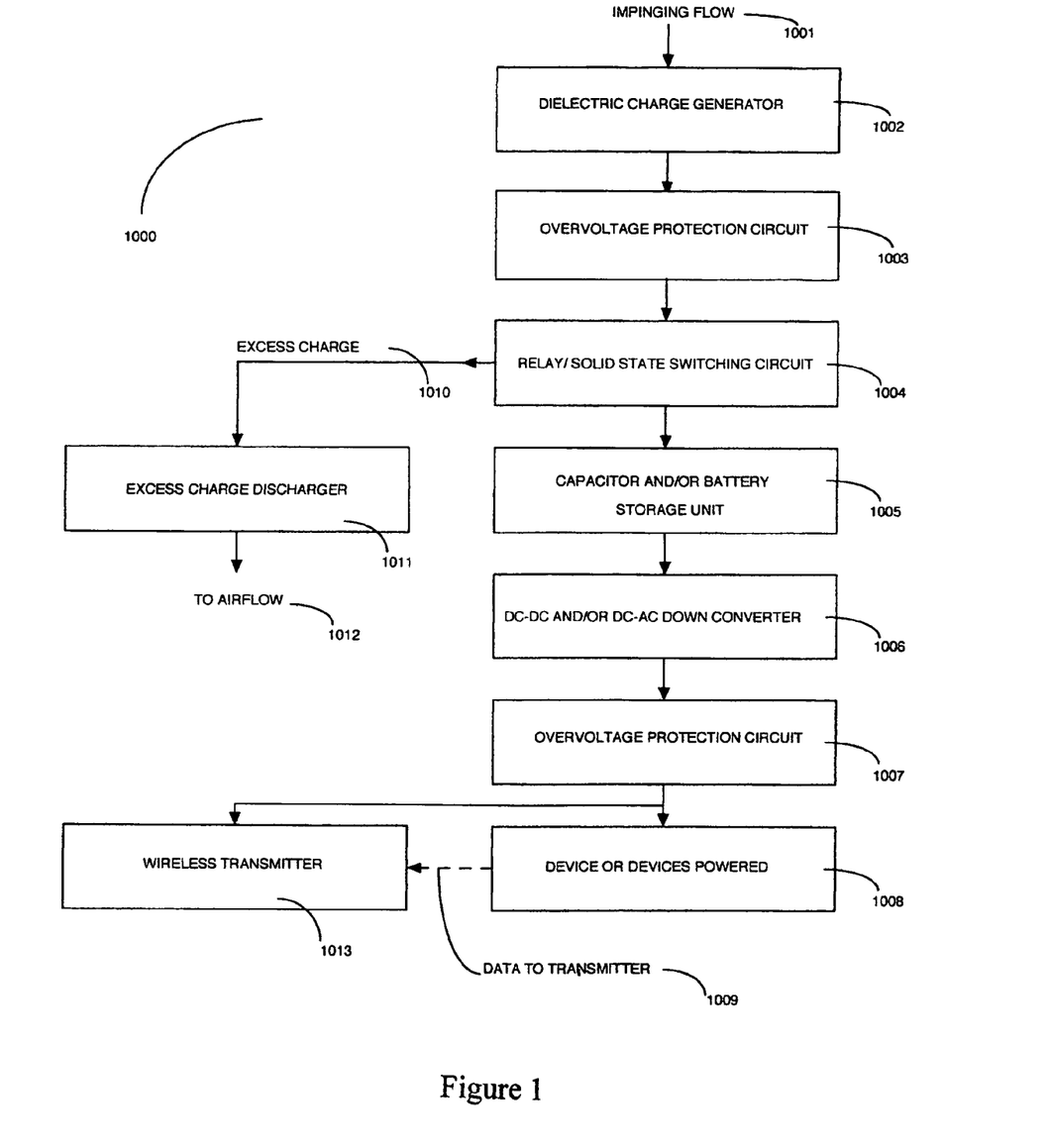
FIG. 1 is an illustrative block diagram of the preferred embodiment of the present invention configured to show the elements comprising the overall P-Static Electrical Power System.
Figure 2:
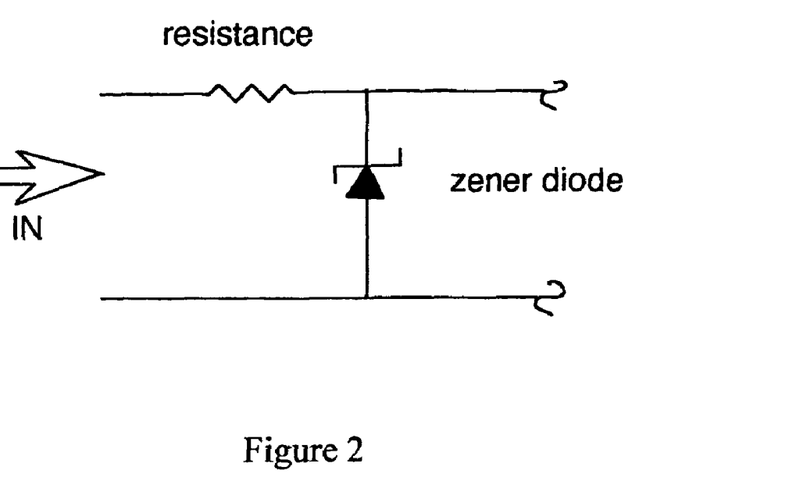
FIG. 2 is an example drawing of the zener diode and resistor circuit used to provide overvoltage protection at both upstream and downstream locations in the P-Static Electrical Power System.
Figure 3:
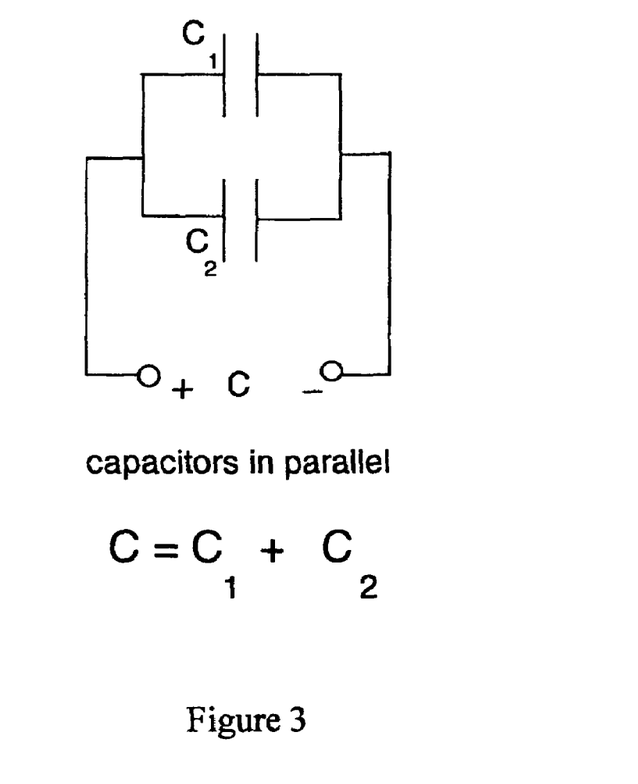
FIG. 3 is a diagram showing the equivalent additive capacitance C for capacitors connected in parallel.

Referring now to the drawings and in particular to FIG. 1, the present invention discloses the block diagram 1000 which includes impinging flow with charging ingredients 1001, a dielectric charge generator 1002, an upstream overvoltage protection circuit 1003, a relay/solid state switching circuit 1004, a rechargeable capacitor (or rechargeable battery) energy storage unit 1005, a DC-to-DC and/or DC-to-AC step down converter 1006, a downstream overvoltage protection circuit 1007, a device or devices to be powered 1008, information and data to wireless transmitter 1009, excess charge 1010, an excess charge discharger 1011, airflow 1012, a wireless transmitter 1013 and an adjacent lightning protection unit (not shown). The upstream overvoltage protection circuit 1003 consists of a zener diode and resistance (or equivalent circuit) placed in the main circuit as shown in FIG. 2. The downstream overvoltage protection circuit 1007 also consists of a zener diode and resistance (or equivalent circuit) whose configuration is the mirror image of that shown in FIG. 2. The rechargeable capacitor (or rechargeable battery) energy storage unit consists of a number of capacitors connected in parallel so that the individual capacitors add together as shown in FIG. 3

When the impinging flow 1001, containing static charge generating ingredients, strikes the non-conducting dielectric charge generating surface 1002, static charge is created. Under P-Static electrical system operating conditions, the static charge which is created is then harvested by metal electrodes attached to the surface of the dielectric. The charge is then carried downstream to the rechargeable capacitor (or rechargeable battery) storage unit 1005 where it is stored in entirety or a portion is stored and the remainder is used to power the device or devices to be powered 1008 and/or the wireless transmitter 1013. On its way downstream from the dielectric charge generator 1002, it passes first through the upstream overvoltage protection circuit 1003 and then through the relay/solid state switching circuit 1004. Downstream of the energy storage unit, the charge passes first through the DC-to-DC and/or DC-to-AC step down converter 1006 and thence through the downstream overvoltage protection circuit 1007 to the device or devices to be powered 1008 and/or to the wireless transmitter 1013.

Normal system operation includes the case where the capacitor or battery storage unit 1005 has not yet reached its maximum allowable charge storage voltage and can still accept more charge, or when the energy storage unit is filled but the device or devices to be powered 1008 and/or the wireless transmitter 1013 are consuming all the electrical power being generated by the dielectric charge generator 1002. If the energy storage unit 1005 is completely filled and the device or devices to be powered 1008 and the wireless transmitter are not consuming any power, the relay/solid state switching circuit intervenes and dumps the excess charge 1010 overboard via the excess charge discharger unit 1011.

A non-conductive, dielectric material which is an excellent producer of static charge when struck by the ingredient filled airstream or wind is Teflon and this material is selected for use as the preferred embodiment of the dielectric charge generating surface 1002. A metal electrode pattern is superimposed on a portion of the Teflon surface area and used to collect the static charge. The upstream overvoltage protection circuit in the example system as well as the downstream overvoltage protection circuit consists of a zener diode and resistor pair (or equivalent circuit). The breakdown voltage of the zener diode is selected to be incrementally higher than the maximum operating voltage of the rechargeable capacitor (or rechargeable battery) storage unit. If a high voltage spike enters the circuit from the upstream direction, the zener diode will undergo breakdown and the spike will be discharged to ground through the resistor circuit element. The same is true if a high voltage spike enters from the downstream direction and encounters the downstream zener diode and resistor pair.

The relay/solid state switching circuit 1004 operates to prevent the rechargeable capacitor (or battery) storage unit from being subjected to voltages that exceeds its maximum operating voltage by dumping excess charge overboard. For the example P-Static Electrical Power System, FIG. 1, the maximum capacitor operating voltage is selected to be 1000 volts while the lowest operating capacitor voltage is selected to be a few hundred volts: the subject P-Static Electrical Power System charging and discharging between a few hundred volts and 1000 volts.

The DC-to-DC and/or DC-to-AC step down converter 1006 converts the high voltage output from the rechargeable capacitor (or rechargeable battery) storage unit, which may be anywhere in the voltage range from a few hundred volts to 1000 volts (or higher) depending on the maximum operating voltage selected, to the voltages used by the device or devices to be powered 1008 and the wireless transmitter 1013: voltages typically in the range from 3 volts to 5 volts. For the example system, the operating voltage of both the device or devices to be powered and the wireless transmitter are taken to be approximately 3 volts.

The amount of energy stored in a capacitor is given by the formula $E = \frac{1}{2} C \times (V \text{ squared})$ where C is the total capacitance and V is the voltage to which the capacitor is charged. Data in the Mouser Electronics Catalog 630—May-July 2007 for low profile thin capacitors, capacitors with vertical heights of a few millimeters, was reviewed to determine, for example, what magnitude of energy storage per unit volume was possessed by capacitors designed to operate at either a maximum charged voltage of 1000 volts or 2000 volts. This review showed that the best low profile thin capacitor found to operate at a maximum of 1000 volts had a product (V squared times C in farads per unit volume in millimeters cubed) of $1.75 \times 10$ to the minus 3 while the best thin capacitor found to operate at 2000 volts had a value of $6.5 \times 10$ to the minus 4 for the same parameter. Both capacitors were of the thin ceramic chip type. Because the thin capacitor at 1000 volts has an energy storage index that is a factor of 2.7 times larger than the best capacitor found at 2000 volts, the preferred embodiment of the example P-Static Electrical Power System is chosen to operate at a maximum of 1000 volts rather than 2000 volts maximum. The corresponding ratios for capacitance per unit area at 1000 volts and at 2000 volts are 3.5×10 to the minus 9 and 3.3×10 to the minus 10 in farads per square millimeter, respectively.

Figure 5:
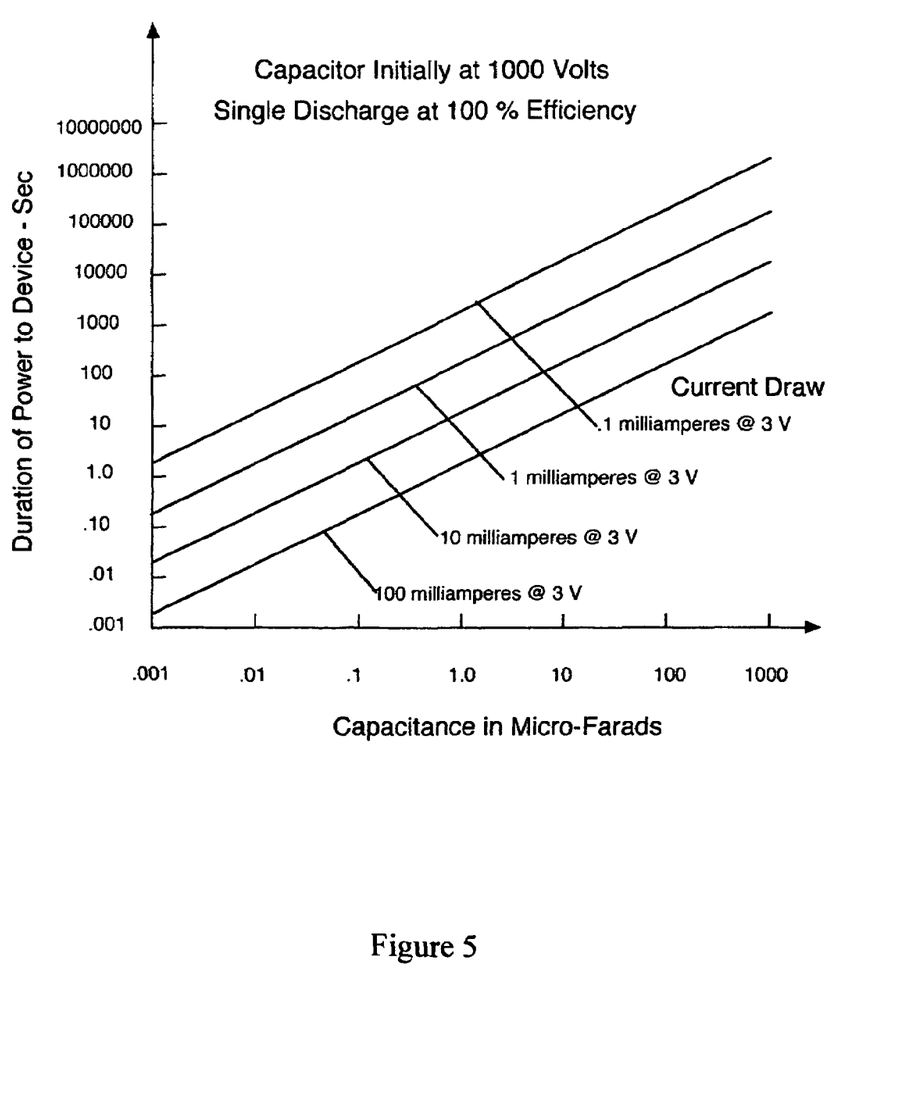
FIG. 5 is a graph of the time duration of electrical power supplied at various current draws as a function of capacitor size measured in farads assuming 100% conversion efficiency.

The capacitor found with the highest energy density at 1000 volts, for example, is item #81-GRM55DR73A104 KW01 on page 631 of the Mouser Electronics Catalog 630—May-July 2007. Physically, the capacitor measures 5.7 mm in length, 5 mm in width and is 2 mm tall and has a capacitance of 0.1 microfarads. The capacitor found in the Mouser catalog with the highest energy density at 2000 volts is item #81-GR443DR73D472 KW01 on page 630 of the same catalog. It measures 4.5 mm in length, 3.2 mm in width, and is 2 mm tall and has a capacitance of 4700 picofarads. The individual 1000 volt capacitors, each with a capacitance of 0.1 microfarads, are electrically ganged together in parallel to achieve higher total capacitance values as illustrated in FIG. 5.

Figure 4:
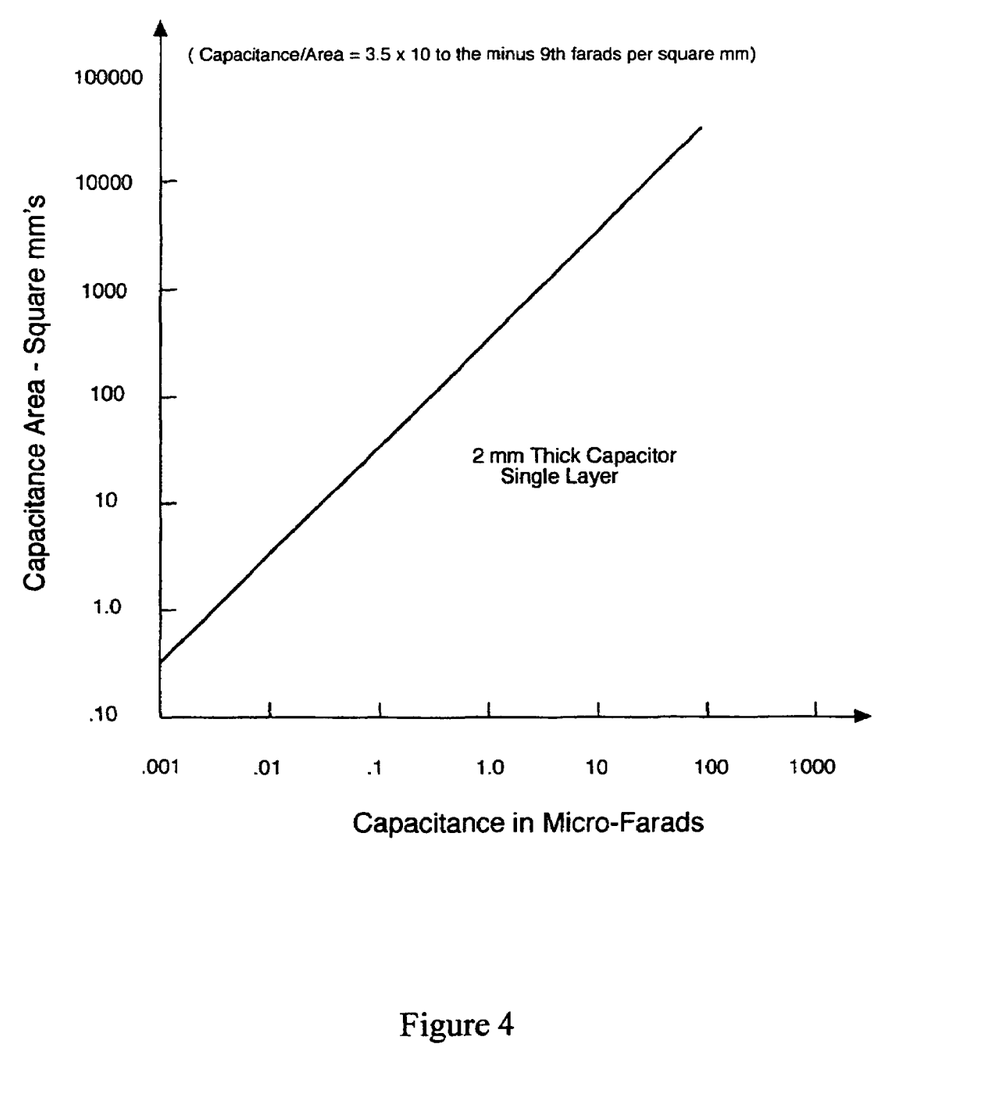
FIG. 4 is a graph of single layer capacitor area coverage versus total capacitance using an example high voltage ceramic chip capacitor of two millimeters height with energy storage at 1000 volts.
Figure 6:
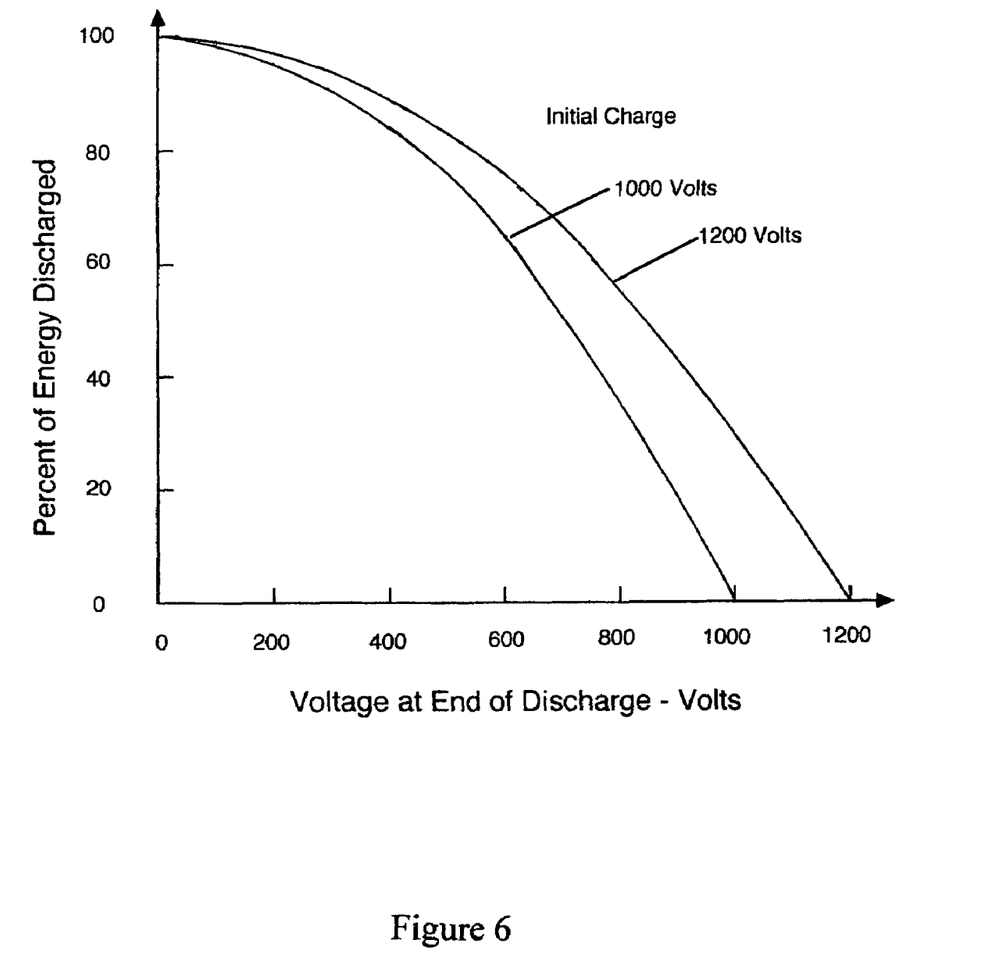
FIG. 6 is a graph of the percentage of energy discharged from a capacitor unit as a function of the difference between its initial voltage of 1000 volts and the minimum voltage where discharge is ceased. Also shown is the case for an initial capacitor unit voltage of 1200 volts.

FIG. 4 is a plot of the plan area in square millimeters that a single layer capacitor unit covers using the best 1000 volt thin capacitor values mentioned above. FIG. 5 is a plot of the time duration that a fixed current drain can be provided at 3 volts by a capacitor unit of a given capacitance during a single discharge using the best 1000 volt thin capacitor values and initially charged to 1000 volts. FIG. 6 is a plot of the percentage of the stored energy that is discharged when the capacitors voltage decreases from its initial charged voltage to a lower voltage. Two examples, one for an initial charged voltage of 1000 volts and the other for 1200 volts, are shown in FIG. 6. These simplified calculations assume that individual 0.1 microfarad capacitors are ganged together without space between them to form the overall single layer and that the entire amount of stored energy is discharged at 100% efficiency when the capacitor is discharged to a final voltage. The results contained in FIG. 4, FIG. 5 and FIG. 6 are provided to quantify values for area and the length of time of current draw for the example system as well as for the percentage of energy discharged.

Similar values, when calculated for an actual capacitor unit would have to consider additional practical design aspects not included in the simplified estimates above. Adequate electrical insulation needs to be provided to prevent shorting between capacitors when ganging multiple capacitors together electrically or when stacking one layer on top of the other to minimize the area covered by the capacitor unit. The addition of electrical insulation will effect area coverage and the height of an assembled multi-layer unit to some degree. Another item that needs to be factored into the overall efficiency is the individual efficiencies of the element or elements used to convert the energy stored in the capacitor unit at 1000 volts or less into usable power at 3 volts. An example of the effects of individual component efficiencies on output are given below.

Let the first example to be considered be that of a single externally mounted, low power consumption Akustica AKU2000 MEMS microphone chip operating at 130 microamperes and 3 volts with its data being transmitted to the interior of the aircraft (or ungrounded object) via a wireless transmitter that consumes 10 milliamperes at 3 volts; a total power consumption of 10.13 milliamperes at 3 volts. A wireless transmitter capable of transmitting a single data stream for distances of 30 meters or less at a power consumption of 10 milliamperes to a receiver is a simple derivative of presently available multi-data stream products. Depending on the overall capacitance value chosen for the capacitor unit, system parameters such as the area covered by the capacitor unit and the corresponding time duration of a single discharge of the capacitor unit may be different. Examples are now considered to illustrate the possible differences.

If a capacitance of 1.0 microfarad (10 individual capacitors of 0.1 microfarads each and 2 mm height ganged together) charged to 1000 volts is chosen, the area covered by the capacitor unit is 290 square millimeters (a square area of 17 mm×17 mm or 0.67 inches by 0.67 inches on a side), the duration of the 10.13 milliamperes power is 16 second (0.27 minutes) for a single discharge and the overall height of the capacitor unit is 2 mm's.

If a capacitance of 10 microfarads (100 individual capacitors of 0.1 microfarads and 2 mm height ganged together) charged to 1000 volts is chosen, the area covered by the capacitor unit is 2900 square millimeters (a square area 54 mm×54 mm or 2.1 inches by 2.1 inches on a side), the duration of the 10.13 milliamperes is 160 seconds (2.7 minutes) for a single discharge and the height is still 2 mm's.

If the capacitor unit for the 10 microfarad example is made in a two layer structure, it covers an area of 1450 square millimeters (a square area 38 mm×38 mm or 1.5 inches by 1.5 inches on a side), has the same discharge time of 160 seconds and its height is 4 mm's.

From the preceding examples, it can be seen that the coverage area, duration of power provided by ganged 1000 volt capacitors and the vertical height of the capacitor unit are reasonable for use in an air vehicle or on other applications. Although a single discharge of the capacitor unit is considered in these simplified calculations, the capacitor (or battery) storage unit may be recharged after every discharge or during each discharge and used to provide electrical power on an intermittent basis or on a continuous basis. Intermittent operation occurs if the area of the dielectric charge generator is chosen too small to continuously meet the required current drain and energy is then provided after recharge of the capacitor unit. An alternative to intermittent operation is achieved by selecting the area of the dielectric charge generator large enough so that the capacitor (or battery) unit is being recharged simultaneously even while it is supplying the 10.13 milliamperes required by the device or devices to be powered and/or the wireless transmitter. FIG. 6 illustrates the tradeoff between the electrical power that may be removed from the capacitor unit as a function of the difference between the initial 1000 volt charge voltage and the voltage chosen as the minimum operating voltage of the capacitor unit where capacitor discharge ceases.

The energy stored in the capacitor energy storage unit 1005 may be converted to useful electrical power at low voltage by a number of methods. An example of an existing device that converts high voltage input DC to low voltage DC is that offered by PICO Electronics Inc in their 2008 catalog. One device that they offer, PICO Part #PD 3.3S, page 113, accepts DC inputs in the range from 380 volts to 200 volts DC and converts that to a constant regulated 3.3 volt DC output at a conversion efficiency of 76%. Though PICO Electronics does not offer at this time a DC to DC converter that will convert from the maximum capacitor bank voltage of 1000 volts of the present invention directly to the 3 volts required by the example considered above, their device topology is capable of doing so but requires that higher voltage integrated circuits be used.

For purposes of illustrating a possible overall conversion efficiency for the present invention, DC-to-DC and AC-to-DC converters from PICO Electronics Inc. will be used to achieve the final down conversion voltage step though it is, in principle, possible to convert directly to the low voltages required by the electronic chips and devices.

A way in which the output of the 1000 volt (or lower operating voltage) capacitor unit may be converted to match the 380 volt to 200 volt DC requirements of PICO Part #PD 3.3S is achieved by first converting the 1000 volts DC to 1000 volt AC using an inverter, then passing the AC voltage thru a transformer to lower its voltage, and finally using a rectifier to convert the AC back to DC voltage levels compatible with PICO Part #PD 3.3S. For example if the maximum capacitor DC voltage of 1000 volts is first converted to 1000 volts AC, a transformer is then selected with a turns ratio of 2.6:1 which converts the 1000 volts AC to 380 volts AC. A rectifier is then used to convert the AC back to 380 volts DC which is compatible with PICO Part #PD 3.3S input requirements. Such an approach is used until the AC output from the inverter reached 520 volts AC and the corresponding output of the rectifier reached the minimum acceptable input voltage of 200 volts DC to PICO Part #PD 3.3S. At that point the capacitor unit undergoes a recharge. If this approach is taken, the energy output from the capacitor bank which operates from 1000 volts to 520 volts (assuming 100% conversion efficiency) is reduced to 73% of that achieved if the capacitor unit was discharge fully to 0 volts.

However, the added inefficiencies of first converting from 1000 volts DC to 1000 volts AC, then utilizing a transformer to lower the AC voltage and finally converting from AC back to DC need to be included in the overall available energy calculations. A nominal conversion efficiency for the initial step of converting from DC to AC is 85%, the transformer operates at a nominal conversion efficiency of 95%, and conversion back to DC from AC has a nominal efficiency of 85%. Therefore if all these inefficiencies are included, the overall available energy output from the system is reduced to 73%×85%×95%×85%×76%=38%; still a reasonable level of energy output for the approach.

If a simple transformer with variable winding is substituted for the fixed winding transformer, the overall system energy output is increased. This approach maintains the transformer winding ratio of 2.6:1 from 1000 volts AC input to 500 volt AC input to the transformer. When 500 volts AC input is reached, the effective transformer winding is reduced to 1.3:1 by switching to a subset of the original winding and a voltage input of 380 volts to the PICO unit is achieved. This approach requires measurement of the AC voltage arriving at the transformer and the use of a switch, at the proper voltage, to select the smaller winding ratio; items which are readily available. This approach allows the discharge to continue down to 260 volts AC input to the transformer which when converted to DC would correspond to 200 volts DC, the lowest allowable DC voltage input to the example PICO device. Energy is now removed from the capacitor unit over the range from 1000 volts to 260 volts or 94% of the stored energy. The overall available energy output from the system would then be 94%×85%×95%×85%×76%=49%; rather than 38% as determined for the previous example where the transformer winding was a single winding with a single fixed ratio. Therefore, values for the duration of 30 milliamperes output and overall energy output presented in FIG. 3 and FIG. 6, respectively, assuming 100% conversion efficiency, need to be lowered by about 50% to 60% for an actual system.

The switching circuit 1004 is composed of two parts: the part that controls the voltage input to the rechargeable capacitor (or rechargeable battery) storage unit and maintains that voltage between minimum and maximum operating voltage values; called the voltage controller, and the part upstream of the voltage controller that protects the voltage controller from voltages in excess of its maximum allowable value. The switching unit is now considered in greater detail.

A P-Static power system is chosen that stores energy in the rechargeable capacitor (or rechargeable battery) storage unit between 520 volts and 1000 volts and has minimum closing and maximum opening operating voltage values for the voltage controller set at these values. For this example, the voltage controller in its simplest form is an electromechanical relay that actuates at these voltages. The part of the switching unit just upstream of the voltage controller, in its simplest form, is also an electromechanical relay whose maximum closing (trip) voltage is set higher than 1000 volts to protect the capacitor unit from overvoltages should the voltage controller not open (trip) at 1000 volts as it should or the dielectric charge generator provides voltage in excess of what is allowed. When this relay trips above 1000 volts and closes, it connects the main circuit to the charge discharger through a companion resistor. Its opening voltage is set just below 1000 volts and when it opens, the main circuit is reestablished.

The foregoing description of the embodiments of the invention has been presented for the purposes of illustration and description. It is not intended to be exhaustive or to limit the invention to the precise form disclosed. Many modifications and variations are possible in the light of this disclosure. It is intended that the scope of the invention be limited not by this detailed description, but rather the claims appended hereto.

I claim:

1. A method for implementing a P-Static Electrical Power System for the independent local generation of electricity on the external surfaces of aircraft or electrically ungrounded objects subjected to an airstream or wind containing charge producing ingredients respectively, and comprising:

means for locally harvesting P-Static electrical charge which forms on the external surfaces of aircraft flying through the earths atmosphere or forms on the external surfaces of electrically ungrounded objects immersed in the wind due to the impact on them of said airstream or wind containing charge producing ingredients, respectively, including but not limited to rain, snow, sleet, dust, ash and/or fog or by any other atmosphere containing charging ingredients including the planetary atmosphere of Mars;

means for causing enhanced local generation of said P-Static electrical charge utilizing a sheet of dielectric material such as Teflon attached or glued to the external surface of said aircraft or ungrounded object and upon which said airstream or wind containing said charge producing ingredients impacts with collection of said P-Static electrical charge so produced using a set of electrodes attached electrically to and covering a portion of the dielectric material;

means for storing of said collected P-Static electrical charge in a high voltage rechargeable capacitor (or rechargeable battery) storage unit at several thousands volts or less with the choice of voltage level selected low enough that the electrical noise radiated by any corona discharge, if it should occur, is sufficiently reduced as to not interfere with the aircraft or ungrounded objects electrical or communications systems;

means for providing a relay/solid state switching circuit which functions as a voltage controller to control the maximum voltage applied to said rechargeable capacitor (or rechargeable battery) storage unit as well as functioning to control the range of voltages used for recharging said capacitor or battery unit and also functions to limit the maximum voltage applied to the storage unit by switching the main circuit temporarily to an excess charge discharger unit to dump the excess charge overboard into the airstream or wind should said voltage controller fail to disengage at its maximum voltage setting and/or the voltage supplied from said dielectric charge generator exceeds a maximum allowable value;

means for providing said excess charge discharger in the form an externally mounted metallic brush (or its equivalent) with a multitude of slender, finely pointed, conducting bristles, located downstream of the P-Static Electrical Power System, which discharges excess charge to the passing airstream or wind;

means for converting the high voltage DC output from said rechargeable capacitor (or rechargeable battery) storage unit to much lower DC and/or AC voltage, in the order of a few volts, to power low voltage devices constructed from semiconductors, transistors or similar types of electronic elements by employing DC-to-DC and/or DC-to-AC step down converters of inverter, transformer and rectifier types;

means for providing said down converted voltage output of said P-Static Electrical Power System to a device or devices to be powered and to a low power or ultra low power, low voltage wireless transmitter that relays information and data back to the main body of the carrying aircraft or ungrounded object for direct use or recording;

means for provision of a lightning diverter unit adjacent to said P-Static Electrical Power System to protect said P-Static Electrical Power System from lightning strikes.

2. The P-Static Electrical Power System recited in claim 1 further comprising:

means for enhanced generation of said P-Static electrical charge using a dielectric material applied or glued to an area or areas of the aircraft or ungrounded object and/or attachment of the P-Static charge collecting electrodes directly to the external surfaces of the aircraft or ungrounded object if these surfaces produce sufficient said P-Static electrical charge by themselves and also with inclusion in said stored P-Static electrical charge of the electrical charge generated locally on said aircraft or ungrounded object by their interaction with the electric and magnetic fields of the earth, by nearby electrical storms and by the propulsion system of the aircraft or ungrounded object.

3. The P-Static Electrical Power System recited in claim 1 further comprising:

apparatus that locally generates, locally collects, and locally stores high voltage P-Static charge along with localized power conditioning devices to convert said P-Static charge to useful low voltage electricity; said apparatus comprising a dielectric charge generator, an upstream overvoltage protection circuit, a relay/solid state switching circuit, a high voltage rechargeable capacitor (or rechargeable battery) storage unit, a DC-to-DC and/or DC-to-AC step down converters, a downstream overvoltage protection circuit, a device or devices to be powered, an ultra low power, low voltage wireless transceiver's transmitter, a charge discharger unit and an adjacent lightning diverter unit.

4. The P-Static Electrical Power System recited in claim 1 further comprising:

a Teflon dielectric surface (or equivalent) for the enhanced production of said P-Static charge with charge collection electrodes electrically mated to the dielectric surface and covering a portion of it.

5. The P-Static Electrical Power System recited in claim 1 further comprising:

two zener diode and resistor auxiliary circuits (or equivalent), one placed in the main circuit just downstream of the dielectric charge generator and the other placed in the main circuit just upstream of said device or devices to be powered and said wireless transmitter, which operate to protect elements between them from receiving any high voltage spike if one attempts to enter the main circuit from either upstream or downstream direction by temporarily switching the main circuit to said external charge discharger unit until the input voltage is reduced to an acceptable level.

6. The P-Static Electrical Power System recited in claim 1 further comprising:

said relay/solid state switching circuit that controls the maximum voltage and the range of voltages applied to said rechargeable capacitor (or rechargeable battery) storage unit and operates to temporarily switch the main circuit to said external charge discharger unit should the voltage controller not disengage properly when it reaches its maximum operating voltage or said dielectric charge generator provides excessive voltage.

7. The P-Static Electrical Power System recited in claim 1 further comprising:

said step down converter which reduces the high voltage DC output of said rechargeable capacitor (or rechargeable battery) storage unit to the low voltage DC and/or AC power required by said device or devices to be powered and said wireless transmitter.

8. The P-Static Electrical Power System recited in claim 1 further comprising:

said device or devices to be powered and said wireless transmitter which are supplied electrical power by said P-Static Electrical Power System.

9. The P-Static Electrical Power System recited in claim 1 further comprising:

a metallic brush type external charge discharger unit (or equivalent) which dumps excess voltage charge into the airstream or wind.

10. The P-Static Electrical Power System recited in claim 1 further comprising:

said lightning diverter strip placed adjacent to said P-Static Electrical Power System to protect it from lightning strikes.

11. The P-Static Electrical Power System recited in claim 1 further comprising:

the independent generation of electrical power locally anywhere on the external surfaces of an aircraft flying through the earths atmosphere or on the external surfaces of an ungrounded object in the wind by collecting said P-Static charge that is generated on a dielectric material surface and converting it to useful electric power for a local device or devices and/or a local wireless transmitter.

12. The P-Static Electrical Power System recited in claim 1 further comprising:

the collocation of all parts of said P-Static Electrical Power System at any external surface location on an aircraft or ungrounded object.

13. The P-Static Electrical Power System recited in claim 1 further comprising:

the elimination of all internal wiring that ordinarily carries electrical power from the aircraft or ungrounded objects internal power system to said remotely located device or devices to be powered along with the elimination of associated installation costs.

14. The P-Static Electrical Power System recited in claim 1 further comprising:

the elimination of all internal wiring that ordinarily carries information and data back from said device or devices to an internal part of the aircraft or ungrounded object for immediate use and/or recording and is replaced by a local P-Static electrically powered wireless transmitter.

15. The P-Static Electrical Power System recited in claim 1 further comprising:

the storage of said P-Static electrical charge locally in a high voltage rechargeable capacitor (or rechargeable battery) storage unit and power conditioning elements are provided locally to convert said high voltage P-Static electrical charge to low voltage DC and/or AC electricity utilizing inverters, transformers and/or rectifiers.

16. The P-Static Electrical Power System recited in claim 1 further comprising:

the protection of major components of said P-Static Electrical Power System from receiving high voltage spikes, either from upstream or downstream circuit directions, by appropriately placed zener and resistance circuits (or equivalent).

17. The P-Static Electrical Power System recited in claim 1 further comprising:

the provision of a relay/solid state switching circuit to regulate the voltage to said rechargeable capacitor (or rechargeable battery) storage unit and to protect it and other downstream circuit elements from overvoltages arising from a failure by dedicated parts of said switching circuit to temporarily disengage said rechargeable capacitor (or rechargeable battery) storage unit from the main circuit if its maximum operating voltage is to be exceeded.

18. The P-Static Electrical Power System recited in claim 1 further comprising:

using the P-Static Electrical Power System which is provided to generate low voltage electrical output in the range of a few volts with amperage nominally in the range from 10 milliamperes to 100 milliamperes or more and matched to the requirements of the local electronic chips and/or devices to be powered.

19. The P-Static Electrical Power System recited in claim 1 further comprising:

the collocation of said P-Static electrical power system, said device or devices to be powered and said wireless transmitter in a thin, pliable patch that is attached anywhere on the aircraft or ungrounded object and whose height, measured as a few millimeters, does not effect or interfere with the flow around the aircraft or ungrounded object nor does it significantly add to the drag of either.

20. The P-Static Electrical Power System recited in claim 1 further comprising:

the placement of said lightning diverter strip (or equivalent) adjacent to said P-Static Electrical Power System to protect it from lightning strikes.

* * * * *